(12) United States Patent
Almajnouni et al.

(10) Patent No.: US 12,540,282 B2
(45) Date of Patent: Feb. 3, 2026

(54) METHODS FOR DISTRIBUTING CATALYST IN COUNTER-CURRENT REACTORS AND METHODS FOR PROCESSING HYDROCARBONS

(71) Applicants: Saudi Arabian Oil Company, Dhahran (SA); King Abdullah University of Science and Technology, Thuwal (SA)

(72) Inventors: Khalid Ali Almajnouni, Jeddah (SA); Mengmeng Cui, Thuwal (SA); Pedro Castano, Thuwal (SA); Jorge Gascon Sabate, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 117 days.

(21) Appl. No.: 18/474,954

(22) Filed: Sep. 26, 2023

(65) Prior Publication Data
US 2025/0101316 A1   Mar. 27, 2025

(51) Int. Cl.
*C10G 11/18*   (2006.01)

(52) U.S. Cl.
CPC .... *C10G 11/182* (2013.01); *C10G 2300/4012* (2013.01); *C10G 2400/20* (2013.01)

(58) Field of Classification Search
CPC ........ B01J 8/0015; B01J 8/125; B01J 8/1881; B01J 8/24; B01J 8/26; B01J 8/388; C10G 11/182; C10G 2300/4012; C10G 2400/20
See application file for complete search history.

(56) References Cited

U.S. PATENT DOCUMENTS

| | | | |
|---|---|---|---|
| 2,348,699 A | 5/1944 | Tuttle | |
| 2,429,359 A | 10/1947 | Kassel | |

(Continued)

FOREIGN PATENT DOCUMENTS

| | | |
|---|---|---|
| CN | 102086402 A | 6/2011 |
| CN | 109554190 A | 4/2019 |

(Continued)

OTHER PUBLICATIONS

Notification of Transmittal of the International Search Report and the Written Opinion of the International Searching Authority, or Declaration dated Aug. 9, 2024 pertaining to International application No. PCT/US2024/024210 filed Apr. 12, 2024, pp. 1-14.

(Continued)

*Primary Examiner* — Ellen M McAvoy
*Assistant Examiner* — Chantel Graham
(74) *Attorney, Agent, or Firm* — DINSMORE & SHOHL LLP (57) ABSTRACT

Methods for distributing catalyst in a counter-current reactor may include passing the catalyst from a catalyst hopper to a perforated plate distributor; distributing the catalyst into a reaction zone of the counter-current reactor by passing the catalyst from a catalyst discharge zone, through the perforations of the perforated plate distributor, into the reaction zone, wherein the catalyst enters the perforations of the perforated plate distributor at a superficial velocity from 0.01 m/s to 10 m/s, and the superficial velocity is in a substantially downward direction; and passing a hydrocarbon feed stream into the reaction zone, wherein the catalyst moves in a substantially downward direction through the reaction zone, the hydrocarbon feed stream moves in a substantially upward direction through the reaction zone, and wherein contacting the catalyst with the hydrocarbon feed stream cracks one or more components of the hydrocarbon feed stream and forms a hydrocarbon product stream.

15 Claims, 6 Drawing Sheets

(56) References Cited

U.S. PATENT DOCUMENTS

| | | |
|---|---|---|
| 2,561,334 A | 7/1951 | Bowles et al. |
| 2,685,498 A * | 8/1954 | Dickinson ............... C10G 9/00 |
| | | 208/159 |
| 2,862,871 A | 12/1958 | Smith |
| 2,882,206 A | 4/1959 | Martin et al. |
| 2,929,774 A | 3/1960 | Smith |
| 3,498,907 A | 3/1970 | Doelp, Jr. et al. |
| 3,551,513 A | 12/1970 | Suzukawa et al. |
| 3,650,946 A | 3/1972 | Mourning |
| 3,708,552 A | 1/1973 | Kunii et al. |
| 3,799,868 A | 3/1974 | Gantt |
| 3,799,886 A | 3/1974 | Felice et al. |
| 3,837,822 A | 9/1974 | Ward |
| 3,879,281 A | 4/1975 | Jones et al. |
| 4,087,350 A | 5/1978 | Kolombos et al. |
| 4,247,987 A | 2/1981 | Coulaloglou et al. |
| 4,259,175 A | 3/1981 | Mcarthur |
| 4,340,465 A | 7/1982 | Miller et al. |
| 4,356,082 A | 10/1982 | Gross |
| 4,514,285 A | 4/1985 | Niccum et al. |
| 4,552,645 A | 11/1985 | Gartside et al. |
| 4,820,493 A | 4/1989 | Haddad et al. |
| 5,062,944 A | 11/1991 | Leib et al. |
| 5,451,313 A | 9/1995 | Wegerer et al. |
| 5,462,652 A | 10/1995 | Wegerer |
| 5,468,369 A | 11/1995 | Muldowney |
| 5,944,982 A | 8/1999 | Lomas |
| 6,656,346 B2 | 12/2003 | Ino et al. |
| 6,869,521 B2 | 3/2005 | Lomas |
| 7,077,949 B2 | 7/2006 | Bakker et al. |
| 7,179,427 B2 * | 2/2007 | Marchant ............... B01J 8/125 |
| | | 422/147 |
| 7,425,258 B2 | 9/2008 | Chen et al. |
| 7,479,218 B2 | 1/2009 | Letzsch |
| 7,594,994 B1 | 9/2009 | Seibert et al. |
| 7,658,837 B2 | 2/2010 | Soares Cerqueira et al. |
| 8,349,170 B2 | 1/2013 | Tammera et al. |
| 9,388,095 B2 | 7/2016 | Leroy et al. |
| 9,452,404 B2 | 9/2016 | Marri et al. |
| 9,458,394 B2 | 10/2016 | Dean et al. |
| 9,771,530 B2 | 9/2017 | Sayed et al. |
| 2003/0194360 A1 | 10/2003 | Huziwara et al. |
| 2004/0024276 A1 | 2/2004 | Smith et al. |
| 2004/0065591 A1 | 4/2004 | Rockwell |
| 2004/0104148 A1 | 6/2004 | Lomas et al. |
| 2004/0124124 A1 | 7/2004 | Assumpcao et al. |
| 2007/0205139 A1 | 9/2007 | Kulprathipanja et al. |
| 2008/0035526 A1 | 2/2008 | Hedrick et al. |
| 2011/0108458 A1 | 5/2011 | Leonard et al. |
| 2012/0291340 A1 | 11/2012 | Boon et al. |
| 2013/0338418 A1 | 12/2013 | Xu et al. |
| 2014/0014555 A1 * | 1/2014 | Marri .................... B01J 8/0015 |
| | | 208/78 |
| 2014/0142362 A1 | 5/2014 | Davydov et al. |
| 2016/0160134 A1 | 6/2016 | Voolapalli et al. |
| 2019/0316041 A1 | 10/2019 | Tian et al. |
| 2019/0316047 A1 | 10/2019 | Al-Majnouni et al. |
| 2021/0179514 A1 | 6/2021 | Thinon et al. |
| 2021/0317373 A1 | 10/2021 | Gong et al. |
| 2022/0033714 A1 | 2/2022 | Al-Majnouni et al. |
| 2023/0167370 A1 | 6/2023 | Almajnouni et al. |

FOREIGN PATENT DOCUMENTS

| | | | |
|---|---|---|---|
| WO | 0179392 A2 | 10/2001 | |
| WO | 2013089885 A1 | 6/2013 | |
| WO | 2014011759 A1 | 1/2014 | |
| WO | WO-2018169768 A1 * | 9/2018 | ............. C07C 11/04 |
| WO | 2020109885 A1 | 6/2020 | |
| WO | 2021019465 A1 | 2/2021 | |

OTHER PUBLICATIONS

Search Report pertaining to International Application No. PCT/US2021/036336 dated Oct. 5, 2021, 16 pages.

Search Report pertaining to International Application No. PCT/US2022/051206 dated Mar. 15, 2023, 13 pages.

* cited by examiner

METHODS FOR DISTRIBUTING CATALYST IN COUNTER-CURRENT REACTORS AND METHODS FOR PROCESSING HYDROCARBONS

TECHNICAL FIELD

Embodiments of the present disclosure generally relate to methods for distributing catalyst, and more specifically, to methods for distributing catalyst in counter-current reactors.

BACKGROUND

Light olefins, including ethylene, propylene, and butene, are basic intermediates used by a large portion of the petrochemical industry. In particular, pure streams of light olefins may be used during the production of various polymers and chemicals. Light olefins may be produced by catalytic cracking processes. As the demand for light olefins increases, there is a need for improved catalytic cracking methods, including improved methods for distributing catalyst.

SUMMARY

Uniform distribution of catalyst within a reactor may improve the selectivity of catalytic cracking processes for desired products, such as light olefins. Embodiments of methods for distributing catalyst described herein include passing catalyst through the perforations of a perforated plate distributor and into the reaction zone of a counter-current reactor. The catalyst may enter the perforations of the perforated plate distributor at a superficial velocity from 0.01 m/s to 10 m/s. Passing the catalyst through the perforated plate distributor at such a superficial velocity may result in more uniform distribution of catalyst within the reaction zone. This may result in improved control over contact time between catalyst and hydrocarbons within the reactor, which may lead to increased yield of desired products, such as light olefins, and a decrease in the occurrence of undesired side reactions.

According to one or more embodiments, a method for distributing catalyst in a counter-current reactor comprises: passing the catalyst from a catalyst hopper to a perforated plate distributor, wherein the perforated plate distributor comprises a plate extending along a substantially horizontal cross-section of the counter-current reactor, the plate comprising a plurality of perforations, and wherein the catalyst comprises particulate solids; distributing the catalyst into a reaction zone of the counter-current reactor by passing the catalyst from a catalyst discharge zone, through the perforations of the perforated plate distributor, into the reaction zone, wherein the catalyst enters the perforations of the perforated plate distributor at a superficial velocity from 0.01 m/s to 10 m/s, and wherein the superficial velocity is in a substantially downward direction; and passing a hydrocarbon feed stream into the reaction zone, wherein the catalyst moves in a substantially downward direction through the reaction zone, the hydrocarbon feed stream moves in a substantially upward direction through the reaction zone, and wherein contacting the catalyst with the hydrocarbon feed stream cracks one or more components of the hydrocarbon feed stream and forms a hydrocarbon product stream.

According to one or more embodiments, a method for processing hydrocarbons to produce light olefins comprises: passing a hydrocarbon feed stream into a feed inlet of a counter-current reactor, wherein the counter-current reactor comprises: a catalyst hopper; an upper reactor portion comprising an upper reaction zone, the upper reactor portion comprising a perforated plate distributor and a hydrocarbon product outlet, wherein the perforated plate distributor and the hydrocarbon product outlet are positioned at or near the top of the upper reactor portion, and wherein the perforated plate distributor comprises a plate extending along a substantially horizontal cross-section of the upper reactor portion, the plate comprising a plurality of perforations; and a lower reactor portion defining a lower reaction zone, the lower reactor portion comprising a feed inlet and a catalyst outlet, wherein feed inlet and the catalyst outlet are positioned at or near the bottom of the lower reactor portion, and wherein the lower reaction zone is in fluid communication with and adjacent to the upper reaction zone; wherein: the catalyst comprises particulate solids and the catalyst moves in a generally downward direction through the upper reactor portion and the lower reactor portion and the hydrocarbon feed stream moves in a generally upward direction through the upper reactor portion and lower reactor portion such that the hydrocarbon feed stream and the catalyst move with a counter-current orientation; and contacting the catalyst with the hydrocarbon feed stream cracks one or more components of the hydrocarbon feed stream and forms a hydrocarbon product stream, wherein the hydrocarbon product stream comprises one or more of ethylene, propylene, or butene; and distributing the catalyst into the upper reaction zone of the counter-current reactor by passing the catalyst from a catalyst discharge zone, through the perforations of the perforated plate distributor, into the upper reaction zone, wherein the catalyst enters the perforations of the perforated plate distributor at a superficial velocity from 0.01 m/s to 10 m/s; and passing the hydrocarbon product stream out of the upper reaction zone through the hydrocarbon product outlet.

BRIEF DESCRIPTION OF THE DRAWINGS

The following detailed description of specific embodiments of the present disclosure can be best understood when read in conjunction with the following drawings, where like structure is indicated with like reference numerals and in which.

For the purpose of describing the simplified schematic illustrations and descriptions of FIGS. 1 to 5, the numerous valves, temperature sensors, electronic controllers and the like that may be employed and well known to those of ordinary skill in the art of certain chemical processing operations are not included. Further, accompanying components that are often included in typical chemical processing operations, such as air supplies, and flue gas handling systems, are not depicted. Accompanying components that are in cracking units, such as bleed streams, spent catalyst discharge subsystems, and catalyst replacement sub-systems are also not shown. It should be understood that these components are within the spirit and scope of the present embodiments disclosed. It should be understood that the reactor diameter should not be inferred from the drawings and that the diameter of the reactor may be similar or different to the depiction in the drawings. Additionally, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to methods for distributing catalyst. The catalyst may be distributed in a counter-current reactor. According to one or more embodiments described herein, methods for distributing catalyst may include passing the catalyst to a perforated plate distributor and distributing the catalyst into a reaction zone of a counter-current reactor. The catalyst may pass through perforations of the perforated plate distributor and the catalyst may enter the perforations at a superficial velocity from 0.01 m/s to 10 m/s. Distributing the catalyst into the reaction zone of the counter-current reactor at such a superficial velocity may improve the uniformity of the distribution of catalyst in the reaction zone. Improving the uniformity of catalyst flow may allow for improved control the reactor system to avoid undesired side reactions and increase the yield of desired products.

It should be noted that the methods for distributing catalyst may be used in a variety of counter-current reactor systems and are not limited to any exemplary counter-current reactor systems described herein.

As used in this disclosure, a "reactor" refers to a vessel in which one or more chemical reactions may occur between one or more reactants in the presence of one or more catalysts. As used in this disclosure, a "reaction zone" refers to an area where a particular reaction takes place in a reactor. One or more "reaction zones" may be disposed in a reactor. For example, a "reactor portion" may house a "reaction zone," such as an upper reactor portion housing an upper reaction zone. In one or more embodiments described herein, the boundaries of a reaction zone may be at least partially defined by system components of the reactor. For example, in one or more embodiments described herein, a "reaction zone" may be positioned below a perforated plate distributor that may distribute catalyst to the reaction zone.

As used in this disclosure, the term "counter-current" may be used to describe the relationship between process streams flowing in substantially opposite directions where the process streams flow past or through one another. For example, a first process stream flowing in a substantially downward direction may flow counter-current to a second process stream flowing in a substantially upward direction. The direction of the flow of a stream may be in the same direction as the superficial velocity of that stream. As used throughout the present disclosure, the term "counter-current reactor" may be used to describe reactors in which catalyst and reactants and/or products flow through a reactor in a counter-current orientation.

As described herein, "superficial velocity" refers to the velocity at which an individual phase flows through a given cross-sectional area. The bulk flow of a phase is used to determine superficial velocity of that phase; thus, individual particles or molecules within a phase may move in a direction different from, or even opposite to, the bulk flow of a phase without affecting the direction of the superficial velocity of that phase. In one or more embodiments, the superficial velocity of catalyst entering the perforations of the perforated plate distributor may be in a substantially downward direction.

As used in this disclosure, a "catalyst" refers to any substance which increases the rate of a specific chemical reaction. Catalysts described in this disclosure may be utilized to promote various reactions, such as, but not limited to, cracking. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as a cycloalkane, cycloalkane, naphthalene, an aromatic or the like, to a compound which does not include a cyclic moiety or contains fewer cyclic moieties than prior to cracking.

As used in this disclosure, the term "spent catalyst" refers to catalyst that has been introduced to and passed through a reaction zone to crack a hydrocarbon feed, but has not been regenerated in the regenerator following introduction to the reaction zone. The "spent catalyst" may have coke deposited on the catalyst and may include partially coked catalyst as well as fully coked catalysts. The amount of coke deposited on the "spent catalyst" may be greater than the amount of coke remaining on the regenerated catalyst following regeneration.

As used in this disclosure, the term "regenerated catalyst" refers to catalyst that has been introduced to a reaction zone and then regenerated in a regenerator to heat the catalyst to a greater temperature, oxidize and remove at least a portion of the coke from the catalyst to restore at least a portion of the catalytic activity of the catalyst, or both. The "regenerated catalyst" may have less coke, a greater temperature, or both compared to spent catalyst and may have greater catalytic activity compared to spent catalyst. The "regenerated catalyst" may have more coke and lesser catalytic activity compared to fresh catalyst that has not passed through a cracking reaction zone and regenerator.

Figure 1:
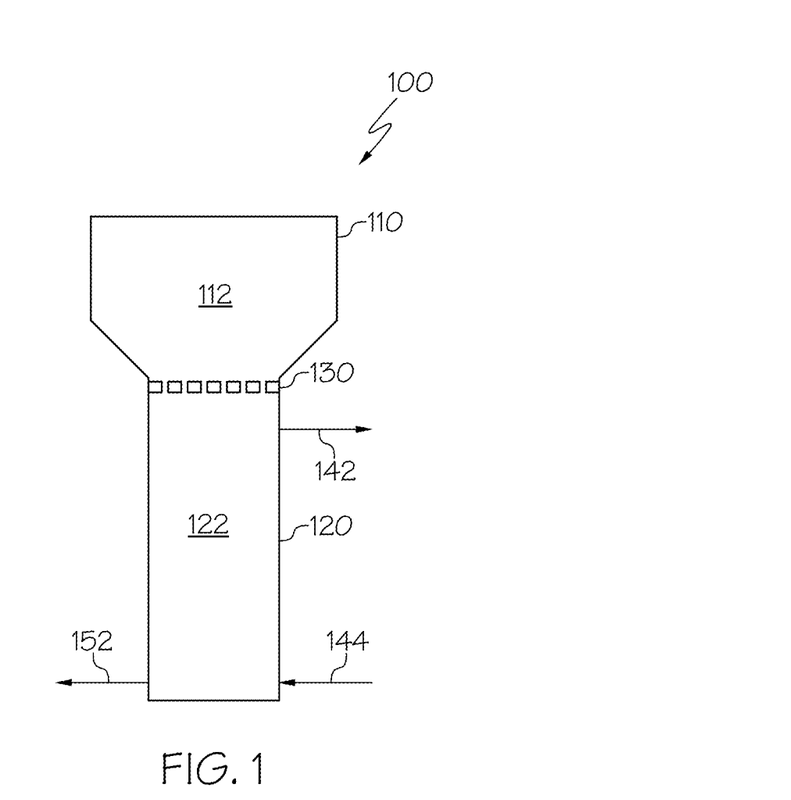
FIG. 1 schematically depicts a counter-current reactor according to one or more embodiments disclosed herein.

Referring now to FIG. 1, a counter-current reactor 100 may comprise a catalyst hopper 110 housing a catalyst discharge zone 112, a reactor portion 120 housing a reaction zone 122, and a perforated plate distributor 130. The perforated plate distributor 130 may be positioned between the catalyst discharge zone 112 and the reaction zone 122. As described herein, the catalyst discharge zone 112 may be positioned above the perforated plate distributor 130, and the reaction zone 122 may be positioned below the perforated plate distributor, such that catalyst may be passed from the catalyst discharge zone 112, through the perforated plate distributor 130, and into the reaction zone 122. In one or more embodiments, the catalyst discharge zone 112 may be dimensioned such that catalyst passing through the catalyst discharge zone 112 may reach the perforated plate distributor 130 at a superficial velocity from 0.01 m/s to 10 m/s, as described in greater detail below.

In one or more embodiments, a method for distributing catalyst in a counter-current reactor 100 may comprise passing catalyst from the catalyst hopper 110 to the perforated plate distributor 130. The catalyst passed from the catalyst hopper 110 to the perforated plate distributor 130 may comprise fresh catalyst, regenerated catalyst, or combinations of fresh and regenerated catalyst as described in further detail herein. According to one or more embodiments, the catalyst may comprise particulate solids. The particulate solids may have any suitable size and shape. For example, the catalyst particulate solids may be sized and shaped such that the particulate solids may be fluidized for transport between system components of the counter-current reactor 100. Additionally, the particulate solids may be sized and shaped to facilitate the reaction or reactions that are performed in the counter-current reactor 100.

Figure 2A:
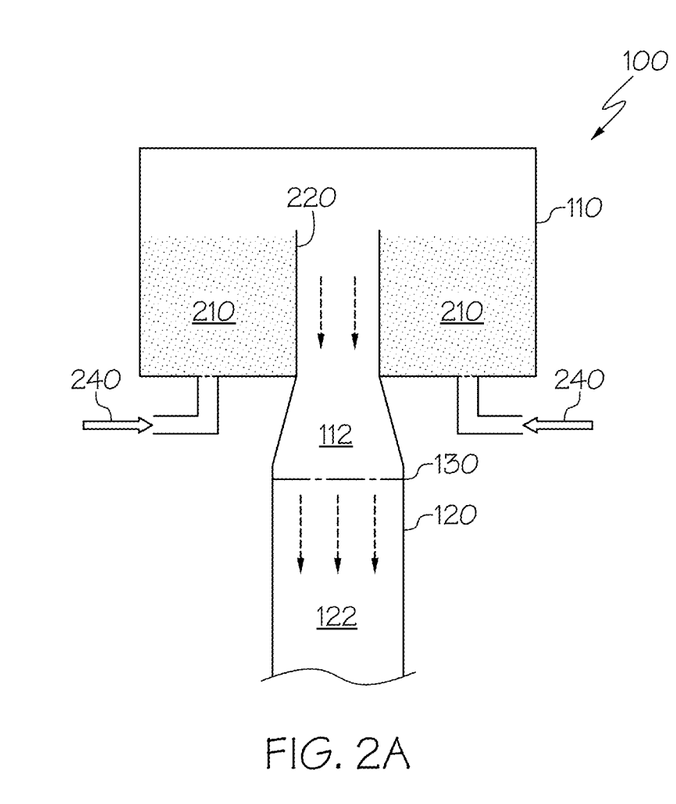
FIG. 2A schematically depicts a catalyst hopper according to one or more embodiments disclosed herein.
Figure 2B:
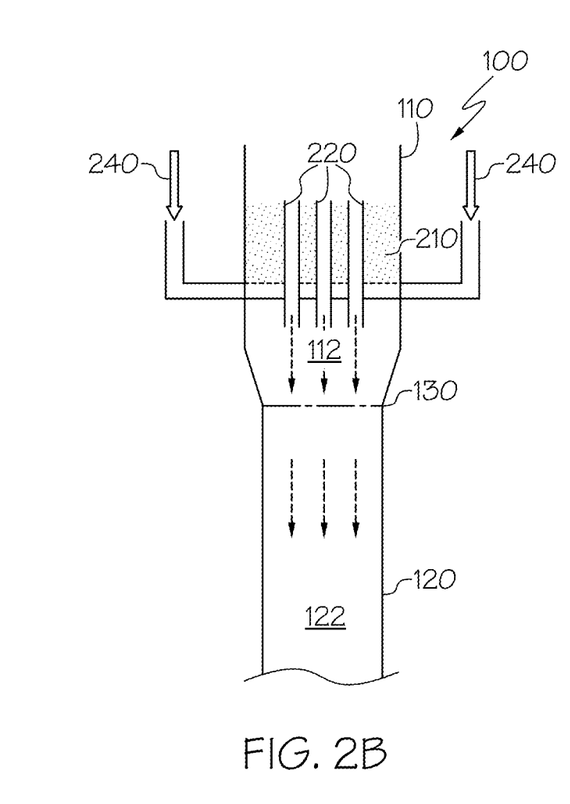
FIG. 2B schematically depicts a catalyst hopper according to one or more embodiments disclosed herein.

Referring now to FIGS. 2A and 2B, in some embodiments described herein, the catalyst hopper 110 may house a fluidized bed of catalyst 210. In one or more embodiments, the fluidized bed of catalyst 210 may have a dense bed fluidization regime. As described herein, a "dense bed fluidization regime" refers to a fluidization regimes in which the fluidized bed has a clearly defined upper limit or surface to the dense bed. For example, dense bed fluidization regimes include the smooth fluidization, bubbling fluidization, slugging fluidization, and turbulent fluidization regimes. In one or more embodiments, a fluidization gas 240 may be passed to the catalyst hopper 110 to fluidize the catalyst. In a dense fluidized bed, the particle entrainment rate may be low, but may increase as the velocity of the gas flowing through the bed increases. Without intending to be bound by theory, the flow rate of the fluidization gas 240 may be used to control the flow rate of catalyst from the catalyst hopper 110 to the perforated plate distributor 130. In one or more embodiments, the fluidization gas may have a flow rate of less than or equal to 5 m/s.

In one or more embodiments, catalyst may overflow from the fluidized bed of catalyst 210 and fall through catalyst discharge zone 112 to the perforated plate distributor 130. Referring to FIG. 2A, catalyst may overflow from fluidized bed of catalyst 210 into conduit 220 and pass from the fluidized bed of catalyst 210 to perforated plate distributor 130 through conduit 220. Referring to FIG. 2B, the catalyst hopper 110 may comprise a plurality of conduits 220. Catalyst may overflow from the fluidized bed of catalyst 210 into the plurality of conduits 220 and pass from the fluidized bed of catalyst 210 to the perforated plate distributor 130. The number of conduits 220 is not necessarily limited. The shapes and distributions of conduits 220 are not necessarily limited. In one or more embodiments, the conduits 220 may be symmetric on a central vertical axis. In one or more embodiments, the catalyst hopper 110 may comprise from 2 to 50 conduits. In some embodiments, the internal diameter of each conduit may be from 5 mm to 30 mm.

Figure 3A:
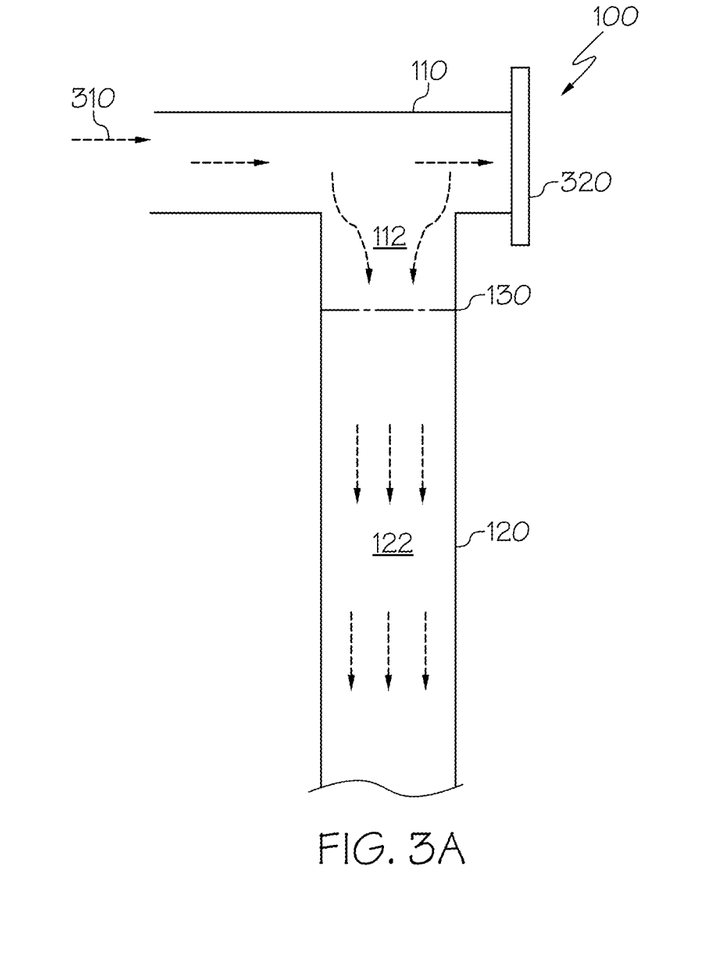
FIG. 3A schematically depicts a catalyst hopper according to one or more embodiments disclosed herein.
Figure 3B:
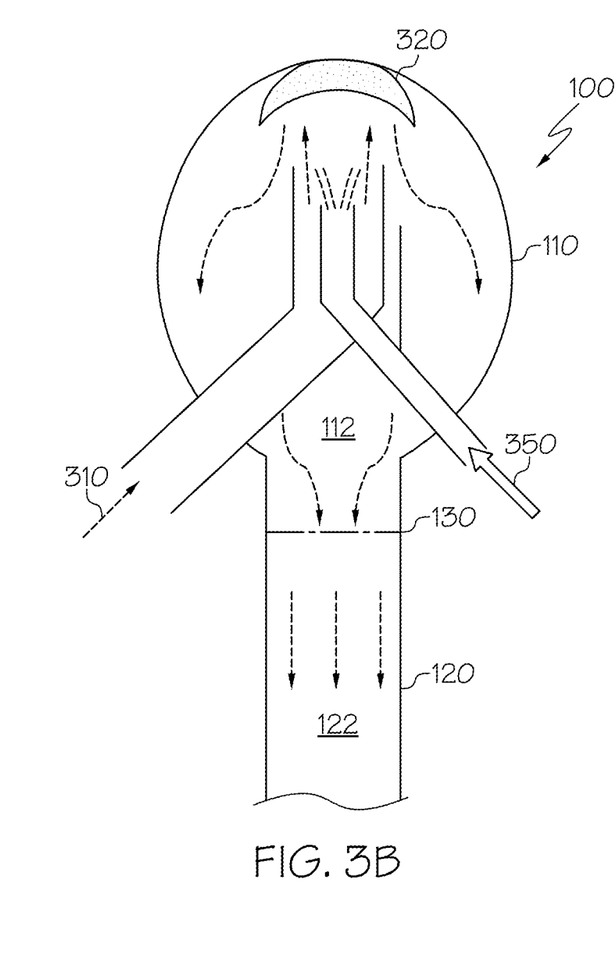
FIG. 3B schematically depicts a catalyst hopper according to one or more embodiments disclosed herein.

Referring now to FIGS. 3A and 3B, in some embodiments described herein, the catalyst hopper 110 may be configured to redirect a transported bed of catalyst to the perforated plate distributor 130. For example, the catalyst hopper 110 may comprise a barrier 320 positioned within the catalyst hopper 110 such that at least a portion of catalyst stream 310 may contact the barrier 320 and be redirected toward the perforated plate distributor 130 through catalyst discharge zone 112. Catalyst stream 310 may be a transported bed of catalyst comprising catalyst and a fluidization gas. In one or more embodiments, the fluidization gas may comprise, steam, an inert gas, such as nitrogen, helium, or argon, or a dry gas, such as methane. In one or more embodiments, the fluidization gas may have a superficial velocity from 1.5 to 10 m/s. Without intending to be bound by theory, the superficial velocity of the fluidization gas may be sufficient to maintain fast fluidization of the transported bed of catalyst.

In the embodiment depicted in FIG. 3A, the catalyst stream 310 may enter the catalyst hopper 110 in a substantially horizontal direction and may be redirected about 90° by the barrier 320 such that the catalyst moves in a substantially downward direction through catalyst discharge zone 112, toward perforated plate distributor 130. While the angle between the barrier 320 and the perforated plate distributor 130 is about 90° in the embodiment depicted in FIG. 3A, in some embodiments, the barrier 320 and the perforated plate distributor 130 may be positioned at any suitable angle, such that catalyst is redirected toward the perforated plate distributor 130. For example, without limitation, the angle between the barrier 320 and the perforated plate distributor may be from 90° to 160°, from 110° to 160°, from 130° to 160°, from 150° to 160°, from 90° to 140°, from 90° to 120°, from 90° to 100°, or any range or combination of ranges formed from these endpoints.

In the embodiment depicted in FIG. 3B, the catalyst stream 310 may enter the catalyst hopper 110 in a substantially vertical direction and the barrier 320 may be shaped and positioned to redirect catalyst down through catalyst discharge zone 112, to the perforated plate distributor 130. In some embodiments, for example, the embodiment depicted in FIG. 3B, supplemental fluidization gas 350 may be passed to the catalyst hopper 110 to control the flow of the transported bed of catalyst.

Figure 4:
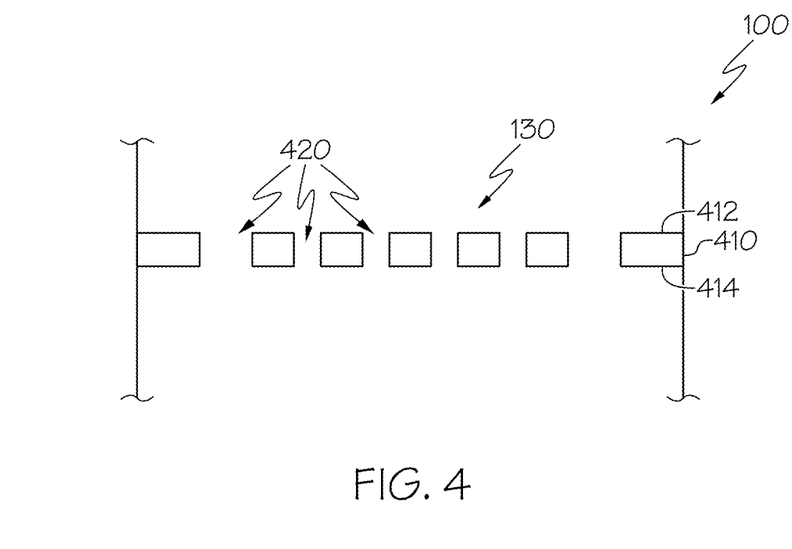
FIG. 4 schematically depicts a perforated plate distributor according to one or more embodiments disclosed herein.

Referring now to FIG. 4, the perforated plate distributor 130 may comprise a plate 410 extending along a substantially horizontal cross-section of the counter-current reactor 100. As described herein, a "substantially horizontal cross-section" may be within 15°, 10°, 5°, or even 1° of horizontal. The plate 410 may have a first major surface 412 and a second major surface 414, the second major surface 414 being opposite the first major surface 412. The plate 410 may comprise a plurality of perforations 420. Each perforation may be an opening extending from the first major surface 412 of the plate 410 to the second major surface 414 of the plate 410. The perforations 420 may be sized such that the catalyst used in the counter-current reactor 100 may pass through the perforations 420. The perforations 420 may be positioned in any suitable pattern or distribution on the plate 410 such that the catalyst is uniformly distributed to the reaction zone 122 of the counter-current reactor 100 when the catalyst is passed through the perforated plate distributor 130. The perforations 420 may have any suitable cross-sectional shape. For example, without limitation, the perforations may have a circular, oval, or polygonal cross sectional shape, in a cross section parallel to the first major surface 412 and the second major surface 414 of the plate 410. In one or more embodiments, the perforated plate distributor 130 may extend along the entirety of a substantially horizontal cross-section of the counter-current reactor 100 such that substantially all of the catalyst entering the reaction zone 122 passes through the perforated plate distributor 130.

In one or more embodiments, the plate 410 may have a thickness from 0.05 m to 0.5 m. The thickness of the plate 410 refers to the distance between the first major surface 412 and the second major surface 414 of the plate 410. For example, without limitation, the plate 410 may have a thickness from 0.05 m to 0.5 m, from 0.1 m to 0.5 m, from 0.15 m to 0.5 m, from 0.2 m to 0.5 m, from 0.25 m to 0.5 m, from 0.3 m to 0.5 m, from 0.35 m to 0.5 m, from 0.4 m to 0.5 m, from 0.45 m to 0.5 m, from 0.05 m to 0.45 m, from 0.05 m to 0.4 m, from 0.05 m to 0.35 m, from 0.05 m to 0.3 m, from 0.05 m to 0.25 m, from 0.05 m to 0.2 m, from 0.05 m to 0.15 m, from 0.05 m to 0.1 m, or any range or combination of ranges formed from these endpoints.

In one or more embodiments, the perforations 420 may have a diameter of from 5 mm to 50 mm. In embodiments with non-circular perforations, the diameter refers to the diameter of the smallest circle circumscribing the perforation 420. For example, the perforations 420 may have a diameter of from 5 mm to 50 mm, from 15 mm to 50 mm, from 25 mm to 50 mm, from 35 mm to 50 mm, from 45 mm to 50 mm, from 5 mm to 40 mm, from 5 mm to 30 mm, from 5 mm to 20 mm, from 5 mm to 10 mm, or any range or combination of ranges formed from these endpoints. In some embodiments the perforations may each have substantially the same size. In some embodiments, the perforations may have different sizes. In some embodiments, the perforations may be arranged in a symmetric pattern on the plate 410. A distance between the perforations 420 is not necessarily limited. In some embodiments, a distance between a perforation 420 and the next closest perforation 420 may be less than or equal to half of the diameter of the perforation 420. The distance between perforations 420 may be the shortest distance from the edge of one perforation 420 to the edge of another perforation 420.

Methods for distributing catalyst described herein may include distributing the catalyst into the reaction zone 122 of a counter-current reactor 100 by passing the catalyst through the perforations 420 of the perforated plate distributor 130. In one or more embodiments, the catalyst may enter the perforations 420 of the perforated plate distributor 130 at a superficial velocity from 0.01 m/s to 10 m/s. For example, the catalyst may enter the perforations 420 of the perforated plate distributor 130 at a superficial velocity from 0.01 m/s to 10 m/s, from 0.1 m/s to 10 m/s, from 0.5 m/s to 10 m/s, from 1 m/s to 10 m/s, from 2 m/s to 10 m/s, from 3 m/s to 10 m/s, from 4 m/s to 10 m/s, from 5 m/s to 10 m/s, from 6 m/s to 10 m/s, from 7 m/s to 10 m/s, from 8 m/s to 10 m/s, from 9 m/s to 10 m/s, from 0.01 m/s to 9 m/s, from 0.01 m/s to 8 m/s, from 0.01 m/s to 7 m/s, from 0.01 m/s to 6 m/s, from 0.01 m/s to 5 m/s, from 0.01 m/s to 4 m/s, from 0.01 m/s to 3 m/s, from 0.01 m/s to 2 m/s, from 0.01 m/s to 1 m/s, from 0.01 m/s to 0.5 m/s, from 0.01 m/s to 0.1 m/s, or any range or combination of ranges formed from these endpoints.

In one or more embodiments, the reaction zone may comprise an acceleration zone and a constant velocity zone. As described herein, an "acceleration zone" refers to a portion of a reaction zone in which catalyst is introduced into the reaction zone and the superficial velocity of the catalyst is changing, and the "constant velocity zone" refers to a portion of the reaction zone in which the superficial velocity of the catalyst is substantially constant. In embodiments, the acceleration zone may be positioned between the perforated plate distributor and the constant velocity zone. Without intending to be bound by theory, when the catalyst passes through the perforated plate distributor 130 at a superficial velocity from 0.01 m/s to 10 m/s the height of the acceleration zone within the reaction zone 122 of the counter-current reactor may be reduced. Reducing the height of the acceleration zone may result in more uniform distribution of catalyst in the reaction zone and more uniform hold-up of catalyst within the reaction zone. In other words, reducing the acceleration zone may result in catalyst moving through the reaction zone in a more uniform manner. This may result in an improved ability to control the reactor. For example, the use of catalyst distributions methods described herein may allow for improved control over contact time within the reactor, which may lead to increased yield of desired products and a decrease in the occurrence of undesired side reactions.

In one or more embodiments, the superficial velocity of the catalyst entering the perforations 420 of the perforated plate distributor 130 may be from 10% to 100% of a stable velocity that the catalyst achieves in the constant velocity zone of reaction zone 122 of the counter current reactor 100. The stable velocity of the catalyst may be calculated according to Equation 1.

$$V_s = G_s/\rho_s \varepsilon_s \qquad \text{Equation 1}$$

In Equation 1, $V_s$ is the mean stable particle velocity (m/s); $G_s$ is the catalyst flux (kg/m²s); $\rho_s$ is the particle density (kg/m³); and $\varepsilon_s$ is the catalyst hold-up. In one or more embodiments, the superficial velocity of the catalyst entering the perforations 420 of the perforated plate distributor 130 may be from 10% to 100%, from 20% to 100%, from 30% to 100%, from 40% to 100%, from 50% to 100%, from 60% to 100%, from 70% to 100%, from 80% to 100%, from 90% to 100%, from 10% to 90%, from 10% to 80%, from 10% to 70%, from 10% to 60%, from 10% to 50%, from 10% to 40%, from 10% to 30%, from 10% to 20% of the stable velocity of the catalyst, or any range or combination of ranges formed from these endpoints. Without intending to be bound by theory, the closer the superficial velocity of the catalyst entering the reaction zone is to the stable velocity of the catalyst, the smaller the acceleration zone may be.

In one or more embodiments, a pressure difference across the perforated plate distributor may be from 0.5 barg to 5 barg. For example, the pressure difference across the perforated plate distributor may be from 0.5 barg to 5 barg, from 1 barg to 5 barg, from 1.5 barg to 5 barg, from 2 barg to 5 barg, from 2.5 barg to 5 barg, from 3 barg to 5 barg, from 3.5 barg to 5 barg, from 4 barg to 5 barg, from 4.5 barg to 5 barg, from 0.5 barg to 4.5 barg, from 0.5 barg to 4 barg, from 0.5 barg to 3.5 barg, from 0.5 barg to 3 barg, from 0.5 barg to 2.5 barg, from 0.5 barg to 2 barg, from 0.5 barg to 1.5 barg, from 0.5 barg to 1 barg, or any range or combination of ranges formed from these endpoints. Without intending to be bound by theory, adjusting the pressure difference across the perforated plate distributor may be used to control the flow properties, such as the superficial velocity, of the catalyst passing through the perforated plate distributor.

In one or more embodiments, a flow rate of the catalyst may be less than a flooding point of the counter-current reactor 100. The flooding point of the counter-current reactor may be calculated using Equation 2.

$$\left[\frac{U_g}{\sqrt{gD}}\left(\frac{\rho_g}{\rho_D}\right)^{1/2}\right]^{2/3} + \frac{1}{2^{1/3}}\left(\frac{G_{s,F}/\rho_p}{\sqrt{gD}}\right)^{2/3} = \left(\frac{1}{2\tan\theta}\right)^{1/3} \quad \text{Equation 2}$$

In Equation 2, $U_g$ is the superficial gas velocity (m/s); g is acceleration due to gravity (m/s$^2$); D is the countercurrent dower reactor diameter (m); $\theta$ is the angle of the internal fraction of particles (about 70° for round particles); $\rho_g$ is the gas density (kg/m$^3$); $\rho_D$ is the density of the dense phase (kg/m$^3$), and $G_{s,F}$ is the flooding point. In one or more embodiments, the catalyst may have a flow rate such that the ratio of catalyst to hydrocarbon feed (the catalyst to oil ratio) in the counter-current reactor 100 is from 5 to 100 based on the mass of the catalyst and hydrocarbons. For example, without limitation, the ratio of catalyst to hydrocarbons in the counter-current reactor 100, based on the mass of the catalyst and hydrocarbons, may be from 5 to 100, from 10 to 100, from 20 to 100, from 30 to 100, from 40 to 100, from 50 to 100, from 60 to 100, from 70 to 100, from 80 to 100, from 90 to 100, from 5 to 90, from 5 to 80, from 5 to 70, from 5 to 60, from 5 to 50, from 5 to 40, from 5 to 30, from 5 to 20, from 5 to 10, or any range or combination of ranges formed from these endpoints.

Referring again to FIG. 1, a hydrocarbon feed stream 144 may enter the reactor portion 120 through one or more hydrocarbon feed inlets located in the reactor portion 120. The one or more hydrocarbon feed inlets may be positioned at or near the bottom of the reactor portion 120. The reactor portion may also comprise one or more catalyst outlets positioned at or near the bottom of the reactor portion 120 such that catalyst stream 152 may exit the reactor portion 120. In one or more embodiments, catalyst stream 152 may comprise spent catalyst. As described herein, at or near the bottom of the reactor portion 120 corresponds to positions in the bottom 10%, bottom 5%, or even bottom 1% of the height of the reactor portion 120. The reactor portion 120 may comprise a hydrocarbon product outlet, which may be positioned at or near the top of the reactor portion 120. As described herein, at or near the top of the reactor portion corresponds to positions in the top 10%, top 5%, or even top 1% of the height of the reactor portion 120. In one or more embodiments, the hydrocarbon product outlet may be positioned below the perforated plate distributor 130. In some embodiments, the hydrocarbon product outlet may be positioned above the perforated plate distributor. In one or more embodiments, the catalyst may move in a substantially downward direction through the reaction zone 122. The hydrocarbon feed stream 144 may move in a substantially upward direction through the reaction zone 122. Contacting the catalyst with the hydrocarbon feed stream 144 may crack one or more components of the hydrocarbon feed stream 144 to form a hydrocarbon product stream 142.

According to one or more embodiments, the methods for distributing catalyst in a counter-current reactor 100 described hereinabove may be used in methods for processing hydrocarbons to produce light olefins. Embodiments of reactor systems and methods for producing light olefins are described hereinbelow. It should be noted that the methods for distributing catalyst described hereinabove are not necessarily limited to use in reactor systems for producing light olefins, but may be used reactor systems configured to perform a variety of chemical reactions.

Figure 5:
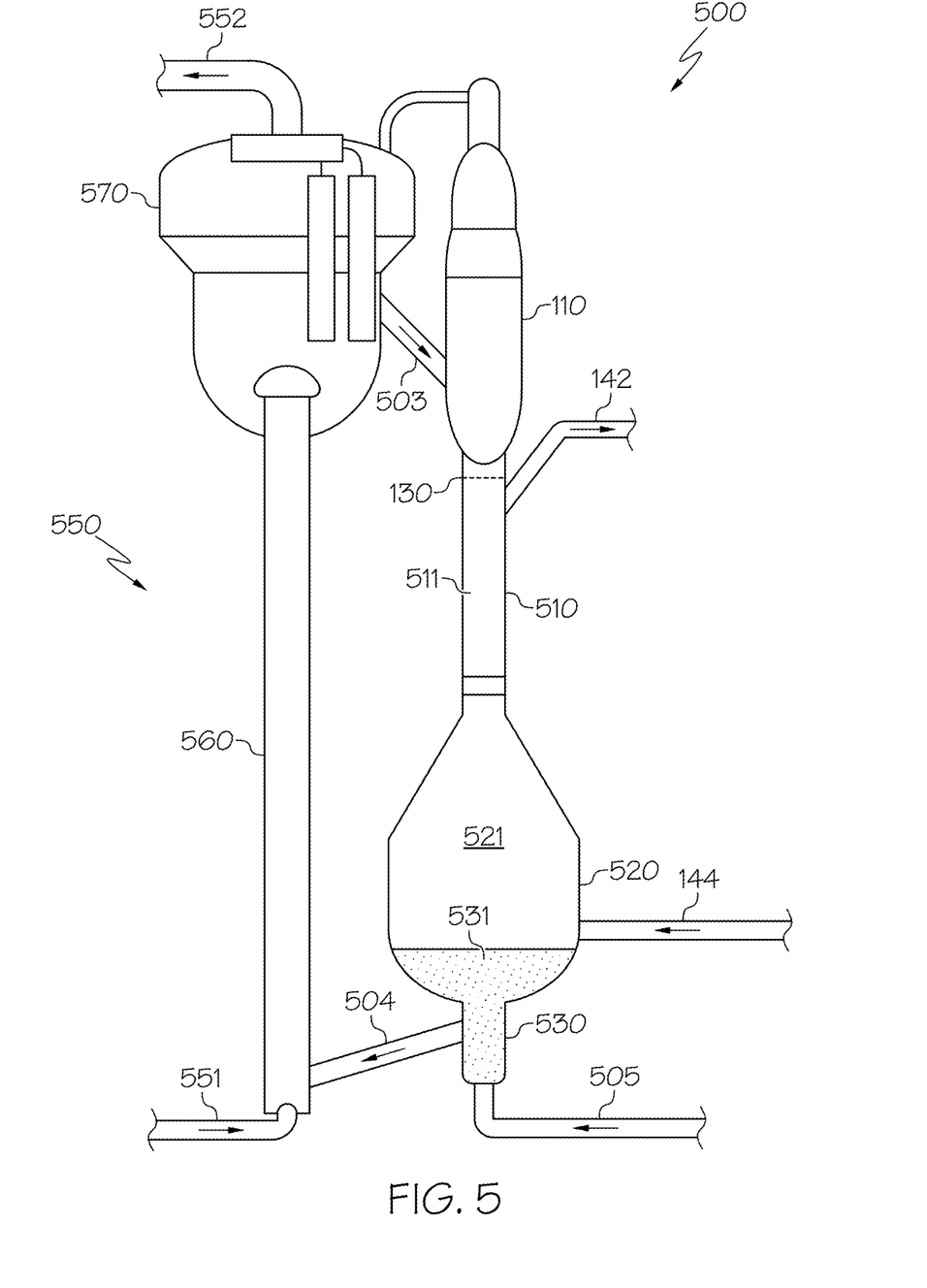
FIG. 5 schematically depicts a reactor and catalyst regenerator for producing light olefins, according to one or more embodiments disclosed herein.

Referring now to FIG. 5, a counter-current reactor 500 for producing light olefins is schematically depicted. The counter-current reactor 500 comprises a catalyst hopper 110, an upper reactor portion 510, and a lower reactor portion 520. In some embodiments, the counter-current reactor 500 comprises a steam stripping portion 530. The upper reactor portion 510 may comprise an upper reaction zone 511. The lower reactor portion 520 may define a lower reaction zone 521. A hydrocarbon feed stream 501 may enter the lower reaction zone 521 through one or more feed inlets located in the lower reactor portion 520. The one or more feed inlets may be positioned at or near the bottom of the lower reactor portion 520. Additionally, the lower reactor portion 520 may comprise one or more catalyst outlets positioned at or near the bottom of the lower reactor portion 520. As described herein, at or near the bottom of the lower reactor portion 520 corresponds to positions in the bottom 10%, bottom 5%, or even bottom 1% of the height of the lower reactor portion 520.

The upper reactor portion 510 defines an upper reaction zone 511. The hydrocarbon feed stream 501 may move through the lower reaction zone 521 and into the upper reaction zone 511. The upper reactor portion 510 and the lower reactor portion 520 may be in fluid communication with each other. In one or more embodiments, the upper reactor portion 510 and the lower reactor portion 520 may be adjacent to each other, with no intervening components or reactor portions. In one or more embodiments, the hydrocarbon feed stream 501 may pass directly from the lower reactor portion 520 to the upper reactor portion 510.

The upper reactor portion 510 includes a hydrocarbon product outlet and a perforated plate distributor 130, which may be positioned at or near the top of the upper reactor portion 510. As described herein, at or near the top of the upper reactor portion 510 corresponds to positions in the top 10%, top 5%, or even top 1% of the height of the upper reactor portion 510. The perforated plate distributor 130 may comprise a plate 410 extending along a substantially horizontal cross-section of the upper reactor portion 510, and the plate 410 may comprise a plurality of perforations 420. The perforated plate distributor 130 may have the structure described hereinabove and depicted in FIG. 4. Catalyst may be distributed into the upper reaction zone 511 of the counter-current reactor 500 by passing through the perforations 420 of the perforated plate distributor 130. In one or more embodiments, the catalyst may enter the perforations 420 of the perforated plate distributor 130 at a superficial velocity from 2 m/s to 20 m/s, as previously described.

The hydrocarbon feed stream 144 may comprise one or more of $C_4$ components, light naphtha, heavy naphtha, full range naphtha, vacuum gas oil, crude oil, FCC gasoline, olefinic naphtha, atmospheric residue, vacuum residue, condensate, deasphalted crude oil, dewaxed crude oil, deasphated-dewaxed crude oil, kerosene, or diesel. In one or more embodiments, the hydrocarbon feed stream 144 may comprise, consist essentially of, or consist of crude oil. As described herein, "crude oil" refers to a naturally occurring mixture of petroleum liquids and gasses. Generally, crude oil may undergo minimal processing before use in the methods described herein. Crude oils contemplated herein include those having an API gravity of from 25° to 40°, such as from 25° to 30°, from 30° to 35°, from 35° to 40°, or any combination of these ranges.

In further embodiments, the hydrocarbon feed stream 144 may comprise a fraction of crude oil, or a petrochemical product formed from a crude oil, having an initial boiling point of at least 25° C. For example, in one or more embodiments, the hydrocarbon feed stream 144 may comprise light naphtha and may have an initial boiling point from 25° C. to 35° C. and a final boiling point of from 85° C. to 95° C. In one or more embodiments, the hydrocarbon feed stream 144 may comprise heavy naphtha and may have an initial boiling point from 80° C. to 95° C. and a final boiling point from 190° C. to 210° C. In further embodiments, the hydrocarbon feed stream 144 may comprise full range naphtha and have an initial boiling point from 25° C. to 35° C. and a final boiling point from 190° C. to 210° C.

In one or more embodiments, the catalyst may comprise a zeolite catalyst, for example, USY zeolite, ZSM-5 zeolite, or a combination of multiple types of suitable zeolite catalysts. Alternatively, the catalyst may comprise other suitable solid acid catalysts. In one or more embodiments, the catalyst may comprise binders, promotors, inert, and matrix to have acceptable physical and chemical properties such as catalyst attrition index and catalyst density so that it can be used in the proposed reactor configuration.

As shown in FIG. 5, the lower reactor portion 520 may have a larger cross-sectional area than the upper reactor portion 510. In one or more embodiments, the lower reactor portion 520 may have a substantially similar cross-sectional area to the upper reactor portion 510.

In one or more embodiments, the upper reaction zone 511 may operate in a counter-current plug flow regime. In one or more embodiments, the hydrocarbon feed 144 may exhibit plug flow as it moves up through the upper reaction zone 511. Likewise, the catalyst may exhibit plug flow as it moves down through the upper reaction zone 511. Since the flow of catalyst is opposed to the flow of the hydrocarbon feed, the flows are counter-current and the upper reaction zone 511 may operate in a counter-current plug flow regime.

In one or more embodiments, the catalyst-to-oil ratio in the upper reaction zone 511 may be from 5 to 100. For example, the catalyst-to-oil ratio in the upper reaction zone 511 may be from 5 to 100, from 10 to 100, from 20 to 100, from 30 to 100, from 40 to 100, from 50 to 100, from 60 to 100, from 70 to 100, from 80 to 100, or even from 90 to 100. In further examples, the catalyst-to-oil ratio in the upper reaction zone 511 may be from 5 to 90, from 5 to 80, from 5 to 70, from 5 to 60, from 5 to 50, from 5 to 40, from 5 to 30, from 5 to 20, or even from 5 to 10. Without wishing to be bound by theory, it is believed that there is less constraint on catalyst-to-oil ratios suitable for use in the upper reaction zone 511 because the catalyst may flow through the upper reaction zone 511 by gravity instead of being transported through the reactor by the flow of hydrocarbons. Additionally, a high catalyst-to-oil ratio indicates a large amount of catalyst within the upper reaction zone 511, which is believed to lead to increased conversion of the hydrocarbon feed to light olefins.

The catalyst may move through the upper reaction zone 511 and into the lower reaction zone 521. In one or more embodiments, the catalyst may pass directly from the upper reaction zone 511 to the lower reaction zone 521. The lower reaction zone 521 may operate in a dense bed fluidization regime. In one or more embodiments, the catalyst may pass from the upper reaction zone 511 to the lower reaction zone 521 and form a dense fluidized bed in the lower reaction zone 521. As described herein, a "dense bed fluidization regime" refers to a fluidization regimes in which the fluidized bed has a clearly defined upper limit or surface to the dense bed. For example, dense bed fluidization regimes include the smooth fluidization, bubbling fluidization, slugging fluidization, and turbulent fluidization regimes. In a dense fluidized bed, the particle entrainment rate may be low, but may increase as the velocity of the gas flowing through the bed increases.

In one or more embodiments, the weight hourly space velocity (WHSV) of the lower reaction zone 521 may be from 1 to 200 $hr^{-1}$. For example, the WHSV of the lower reaction zone 521 may be from 1 to 200 $hr^{-1}$, from 1 to 175 $hr^{-1}$, from 1 to 150 $hr^{-1}$, from 1 to 125 $hr^{-1}$, from 1 to 100 $hr^{-1}$, from 1 to 75 $hr^{-1}$, from 1 to 50 $hr^{-1}$, or even from 1 to 25 $hr^{-1}$. In further examples, the WHSV of the lower reaction zone 521 may be from 25 to 200 $hr^{-1}$, from 50 to 200 $hr^{-1}$, from 75 to 200 $hr^{-1}$, from 100 to 200 $hr^{-1}$, from 125 to 200 $hr^{-1}$, from 150 to 200 $hr^{-1}$, or even from 175 to 200 $hr^{-1}$. WHSV may be used to describe the amount of catalyst in the dense bed of the lower reaction zone 521. Without wishing to be bound by theory, it is believed that a dense bed allows a large amount of catalyst to be present in the lower reaction zone, which may increase the yield of light olefins.

As the hydrocarbon feed stream 144 and the catalyst move through the counter-current reactor 500, the hydrocarbon feed stream 144 may have an upward superficial velocity through a horizontal cross-section of the counter-current reactor 500, and the catalyst may have a downward superficial velocity through a horizontal cross-section of the counter-current reactor 500. For example, the hydrocarbon feed stream 144 may flow from the feed inlet in the lower reactor portion 520 to the hydrocarbon product outlet in the upper reactor portion 510. Thus, the bulk flow of hydrocarbon feed stream 144 moving through a horizontal cross-section of the counter-current reactor 500 is in an upward direction, resulting in an upward superficial velocity. Likewise, the catalyst flows from the perforated plate distributor 130 to the catalyst outlet in the steam stripping portion 530 of the counter-current reactor 500, and the bulk flow of the catalyst moving through a horizontal cross-section of the counter-current reactor 500 is in a downward direction, resulting in a downward superficial velocity. In one or more embodiments, the upward superficial velocity of the hydrocarbon feed stream 144 and the downward superficial velocity of the catalyst results in a counter-current flow pattern between the hydrocarbon feed stream 144 and the catalyst. Thus, in one or more embodiments, the hydrocarbon feed stream 144 and catalyst move with a counter-current orientation.

Without wishing to be bound by theory, it is believed that contacting the hydrocarbon feed stream 144 and the catalyst in a counter-current manner may prevent back-mixing of catalyst that may occur in in traditional riser reactors and may promote undesired side reactions that negatively affect the production of light olefins. Additionally, it is believed that contacting the hydrocarbon feed stream 144 and the catalyst in a counter-current manner may prevent core-annular flow through the reactor where the catalyst has high concentration near the reactor walls and a low concentration toward the center of the reactor where a majority of the hydrocarbon flow occurs. Generally, core-annular flow reduces the amount of contact between the catalyst and the hydrocarbon, and thus, may reduce the conversion of hydrocarbon feed to light olefins.

Without wishing to be bound by theory, it is also believed that counter-current flow may also result in increased yield of olefins by allowing the more reactive chemicals in the hydrocarbon feed to contact less active catalyst, and less active catalyst to contact more reactive chemicals in the hydrocarbon feed. Generally, the catalyst in the lower reaction zone 521 has already contacted hydrocarbons in the upper reaction zone 511. Thus, the catalyst in the lower reaction zone 521 is usually partially spent and has a lower activity than the catalyst in the upper reaction zone 511. Contacting the hydrocarbon feed with a large amount of less active catalyst in the lower reaction zone 521 may allow the more reactive chemicals in the hydrocarbon feed to crack in the lower reaction zone 521 while contacting the less active catalyst. This in turn allows the more active catalyst in the upper reaction zone 511 to crack the less reactive chemicals in the hydrocarbon feed, increasing the yield of light olefins produced from the hydrocarbon feed.

In one or more embodiments, the superficial velocity of the hydrocarbon feed stream 144 moving through the upper reactor portion 510 is 3.0 m/s or less. For example, the superficial velocity of the hydrocarbon feed stream through the upper reactor portion 510 may be 3.0 m/s or less, 2.0 m/s or less, 1.0 m/s or less, 0.9 m/s or less, 0.8 m/s or less, 0.7 m/s or less, 0.6 m/s or less, 0.5 m/s or less, or even 0.4 m/s or less. Without wishing to be bound by theory, it is believed that a hydrocarbon feed stream superficial velocity below 3.0 m/s within the upper reactor portion 510 may result in increased contact between the catalyst and the hydrocarbons, which may in turn lead to increased conversion of the hydrocarbon feed to light olefins. To keep the superficial velocity of the hydrocarbon feed stream 144 within the desired range, the residence time of the hydrocarbons within the counter-current reactor 500 may be controlled by adjusting the height of the upper reactor portion 510 and the height of the lower reactor portion 520.

In one or more embodiments, the residence time of the hydrocarbon feed stream 144 within the counter-current reactor 500 is from 0.1 to 10 seconds. For example, the residence time of the hydrocarbon feed stream 144 within counter-current reactor 500 may be from 0.1 to 10 seconds, from 0.5 to 10 seconds, from 1 to 10 seconds, from 2 to 10 seconds, from 3 to 10 seconds, from 4 to 10 seconds, from 5 to 10 seconds, from 6 to 10 seconds, from 7 to 10 seconds, from 8 to 10 seconds, or even from 9 to 10 seconds. In further examples, the residence time of the hydrocarbon feed stream 144 in the counter-current reactor 500 may be from 0.1 to 9 seconds, from 0.1 to 8 seconds, from 0.1 to 7 seconds, from 0.1 to 6 seconds, from 0.1 to 5 seconds, from 0.1 to 4 seconds, from 0.1 to 3 seconds, from 0.1 to 2 seconds, or even from 0.1 to 1 second.

As the hydrocarbon feed stream 144 contacts the catalyst, at least a portion of the hydrocarbon feed stream 144 may be cracked to form a hydrocarbon product 142. In one or more embodiments, the temperature within the counter-current reactor 500 may be from 420° C. to 750° C. to facilitate the cracking of hydrocarbon feed stream 144. For example, the temperature within the counter-current reactor 500 may be from 460° C. to 750° C., from 500° C. to 750° C., from 540° C. to 750° C., from 580° C. to 750° C., from 620° C. to 750° C., from 660° C. to 750° C., or even from 700° C. to 750° C. In further examples, the temperature within the counter-current reactor 500 may be from 420° C. to 710° C., from 420° C. to 670° C., from 420° C. to 630° C., from 420° C. to 590° C. from 420° C. to 550° C., or even from 420° C. to 510° C. In yet further embodiments, the temperature within the counter-current reactor 500 may be from 440° C. to 720° C., from 480° C. to 680° C.

In one or more embodiments, the hydrocarbon product may comprise light olefins and other reactions products. For example, the hydrocarbon product may comprise, ethylene, propylene, butene or combinations of these in addition to the other reactions products. In one or more embodiments, the other reaction products may comprise dry gas, aromatics, naphtha, light cycle oil, heavy cycle oil, and even heavy oil. In one or more embodiments, a hydrocarbon product stream 142 comprising light olefins may be passed from the upper reaction zone 511 through hydrocarbon product outlet in the upper reactor portion 510. In one or more embodiments, the hydrocarbon product stream 142 may comprise a portion of unreacted hydrocarbon feedstock. In one or more embodiments, the hydrocarbon product stream 142 may comprise catalyst entrained within the hydrocarbon product stream 142, which may be separated from the hydrocarbon product stream 142 in a separation device. Any suitable separation device, including a cyclone or series of cyclones, may be used to separate entrained catalyst from the hydrocarbon product stream 142. In one or more embodiments, the light olefins may be separated from the hydrocarbon product stream 142. Separation of the light olefins from the hydrocarbon product stream 142 may be achieved by any suitable means including, for example, distillation. In one or more embodiments, the separation of light olefins from the hydrocarbon product stream 142 may result in relatively pure streams of ethylene, propylene, or butene.

In one or more embodiments, cracking the hydrocarbon feed stream 144 may produce spent catalyst. Spent catalyst may be produced in both the upper reaction zone 511 and the lower reaction zone 521. In one or more embodiments, spent catalyst may comprise coke on the catalyst. The coke may reduce the activity of the catalyst, and spent catalyst may have reduced activity when compared to regenerated or fresh catalyst. In one or more embodiments, the non-circulating fluidized bed of the lower reaction zone 521 may comprise spent catalyst. Without wishing to be bound by theory, the more reactive components of the hydrocarbon feed stream 144 may crack in the lower reaction zone 521 because high catalytic activity is not required for those components to react. As the hydrocarbon feed passes from the lower reaction zone 521 to the upper reaction zone 511, the hydrocarbon feed will encounter more active, fresh or regenerated catalyst, and the less reactive components of the hydrocarbon feed will crack. Thus, the counter-current flow of the catalyst and the hydrocarbon feed stream 144 may result in increased conversion of hydrocarbon feed to light olefins.

In one or more embodiments, the counter-current reactor 500 may comprise a steam stripping portion 530 below the lower reactor portion 520. The steam stripping portion 530 may define a steam stripping zone 531. The steam stripping portion 530 may be in fluid communication with and adjacent to the lower reactor portion 520. In one or more embodiments, spent catalyst may pass from the lower reaction zone 521 to the steam stripping zone 531. In further embodiments, the spent catalyst may pass directly from the lower reaction zone 521 to the steam stripping zone 531. Steam may be passed to the steam stripping zone 531 by stream 505. In the steam stripping zone 531, steam may contact the spent catalyst and strip at least a portion of the hydrocarbon feed or hydrocarbon products from the spent catalyst. After contacting the steam in the steam stripping zone 531, spent catalyst may be passed in stream 504 from the counter-current reactor 500 through the catalyst outlet.

In one or more embodiments, the spent catalyst may be passed to a catalyst regenerator 550 where the spent catalyst is regenerated to form a regenerated catalyst. The catalyst regenerator 550 may comprise a riser 560 and a separator 570. The spent catalyst may enter the riser 560 through a catalyst inlet. In one or more embodiments, the riser 560 is in fluid communication with the steam stripping zone 531 of the counter-current reactor 500 and the spent catalyst may be passed directly from the steam stripping zone 531 to the riser 560. In one or more embodiments, an air stream 551 is passed to the riser 560, and the air and spent catalyst travel up riser 560. In one or more embodiments, the air stream 551 is used to oxidize at least a portion of the coke on the spent catalyst, restoring activity to the spent catalyst and forming a regenerated catalyst.

The regenerated catalyst and air may move from riser 560 to separator 570. In one or more embodiments, the riser 560 and separator 570 are adjacent to each other and the regenerated catalyst and air move directly from the riser 560 to the separator 570. Separator 570 may be any suitable separation system for separating catalyst from air, including a cyclone separation system. In one or more embodiments, an air stream 552 may exit the separator 570. Additionally, regenerated catalyst may exit the separator 570 through a regenerated catalyst outlet. In one or more embodiments, the regenerated catalyst may be included in the catalyst of stream 503. In one or more embodiments, the separator 570 and catalyst hopper 110 may be in fluid communication with each other and regenerated catalyst may be passed directly from the separator 570 of the regenerator 550 to the catalyst hopper 110 of the counter-current reactor 500. The regenerated catalyst may be passed from the catalyst hopper 110 to the perforated plate distributor 130 and distributed into the upper reaction zone 511. In one or more embodiments, fresh catalyst may be added to catalyst in stream 503. In such embodiments, the catalyst may comprise both regenerated catalyst and fresh catalyst.

EXAMPLES

The following examples illustrate one or more additional features of the present disclosure.

Example 1: Radial Catalyst Distribution in a Counter-Current Reactor

Figure 6:
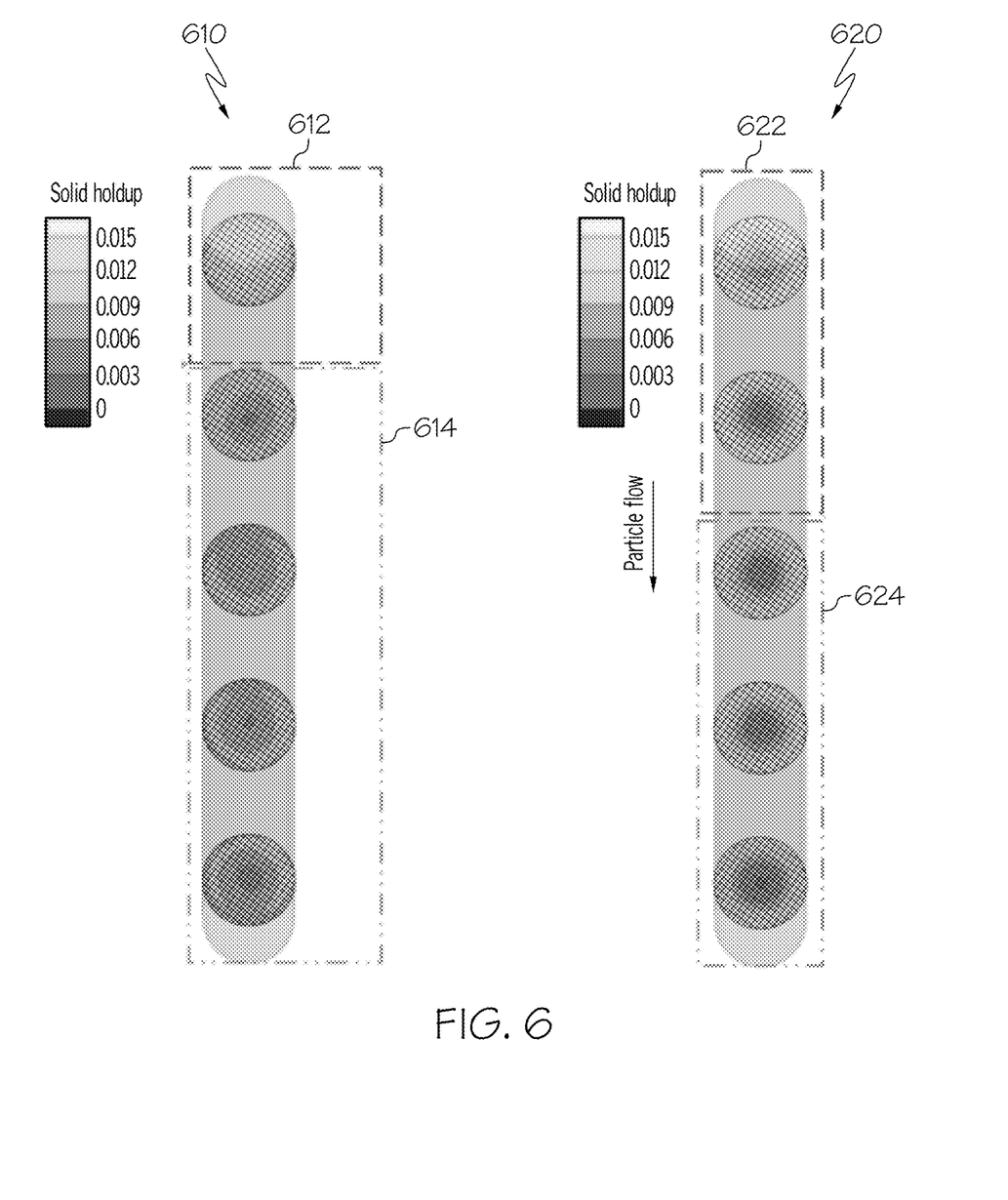
FIG. 6 depicts models of radial catalyst distribution in a counter-current reactor according to the embodiments of Example 1.

The radial particle distribution of catalyst in a counter-current reactor was modeled. Catalyst was modeled entering the top of the counter-current reactor with a uniform radial distribution. The radial distribution of catalyst in the counter-current reactor system was modeled under two steam fractions, 40% and 50% respectively. The radial distribution of catalyst in each reactor is depicted in FIG. 6. The radial distribution of catalyst in the reactor operating with a 40% steam fraction is depicted in reactor 610, the radial distribution of catalyst in the reactor operating with a 50% steam fraction is depicted in reactor 620. The oil flow rate and catalyst to oil ratio were constant between the modeled reactors. The catalyst to oil ratio in each reactor was 60. An increase in the steam fraction results in an increased superficial velocity of the gas passing up through the reactor and a decreased superficial velocity of catalyst passing down through the reactor.

As depicted in FIG. 6, in the model where the steam fraction was 40%, the radial distribution of catalyst in reactor 610 was non-uniform in acceleration zone 612. As catalyst moved into reaction zone 614, the catalyst hold-up decreased, while relatively uniform radial distribution of catalyst was maintained. In the model where the steam fraction was 50%, the radial distribution of catalyst in reactor 620 was also uneven in the acceleration zone 622. Specifically, catalyst near the edges of the reactor experienced a greater hold-up than catalyst near the center of the reactor. As catalyst moved into reaction zone 624, the catalyst hold-up decreased with a more uniform radial distribution of catalyst. The acceleration and reaction zone are observed under different steam fractions of same oil flow rate and catalyst to oil ratio, while the radial catalyst distribution displays more uniformly with an increased superficial velocity of catalyst.

Increasing the velocity at which the catalyst enters the reactor may decrease the length of the acceleration zone. In turn, decreasing the length of the acceleration zone may decrease the portion of the reactor where solid hold-up is less uniform. Non-uniformity of the catalyst hold-up in the reactor may decrease the catalyst-reactant contacting efficiency. Methods for distributing catalyst described herein may result in catalyst entering the reactor at a velocity sufficient to reduce the size of the acceleration zone or even substantially eliminate the acceleration zone. This may result in more uniform radial catalyst distribution in the reactor, which may allow for improved control of the reactor and a decrease in undesired side reactions.

In a first aspect of the present disclosure, a method for distributing catalyst in a counter-current reactor comprises: passing the catalyst from a catalyst hopper to a perforated plate distributor, wherein the perforated plate distributor comprises a plate extending along a substantially horizontal cross-section of the counter-current reactor, the plate comprising a plurality of perforations, and wherein the catalyst comprises particulate solids; distributing the catalyst into a reaction zone of the counter-current reactor by passing the catalyst from a catalyst discharge zone, through the perforations of the perforated plate distributor, into the reaction zone, wherein the catalyst enters the perforations of the perforated plate distributor at a superficial velocity from 0.01 m/s to 10 m/s, and wherein the superficial velocity is in a substantially downward direction; and passing a hydrocarbon feed stream into the reaction zone, wherein the catalyst moves in a substantially downward direction through the reaction zone, the hydrocarbon feed stream moves in a substantially upward direction through the reaction zone, and wherein contacting the catalyst with the hydrocarbon feed stream cracks one or more components of the hydrocarbon feed stream and forms a hydrocarbon product stream.

A second aspect of the present disclosure may include the first aspect, wherein a pressure difference across the perforated plate distributor is from 0.5 barg to 5 barg.

A third aspect of the present disclosure may include either the first or second aspect, wherein a ratio of catalyst to hydrocarbon feed is from 5 to 100 based on the mass of the catalyst and the hydrocarbon feed.

A fourth aspect of the present disclosure may include any of the first through third aspects, wherein the plate of the perforated plate distributor comprises a first major surface and a second major surface opposite the first major surface, wherein each of the plurality of perforations is an opening extending from the first major surface to the second major surface.

A fifth aspect of the present disclosure may include any of the first through fourth aspects, wherein the catalyst hopper houses a catalyst bed having a dense bed fluidization regime, the catalyst overflows from the catalyst bed, and the catalyst falls through the catalyst discharge zone to the perforated plate distributor.

A sixth aspect of the present disclosure may include any of the first through fourth aspects, wherein passing the catalyst from a catalyst hopper to a perforated plate distributor comprises contacting at least a portion of a transported catalyst bed, comprising the catalyst and a carrying gas, with a barrier positioned within the catalyst hopper, such that the catalyst is redirected toward the perforated plate distributor through the catalyst discharge zone.

A seventh aspect of the present disclosure may include the sixth aspect, wherein an angle between the barrier and the perforated plate distributor is from 90° to 160°.

An eighth aspect of the present disclosure may include any of the first through seventh aspects, wherein a superficial velocity of the catalyst in the reaction zone is substantially opposite a superficial velocity of the hydrocarbon feed stream in the reaction zone.

In a ninth aspect of the present disclosure, a method for processing hydrocarbons to produce light olefins comprises: passing a hydrocarbon feed stream into a feed inlet of a counter-current reactor, wherein the counter-current reactor comprises: a catalyst hopper; an upper reactor portion comprising an upper reaction zone, the upper reactor portion comprising a perforated plate distributor and a hydrocarbon product outlet, wherein the perforated plate distributor and the hydrocarbon product outlet are positioned at or near the top of the upper reactor portion, and wherein the perforated plate distributor comprises a plate extending along a substantially horizontal cross-section of the upper reactor portion, the plate comprising a plurality of perforations; and a lower reactor portion defining a lower reaction zone, the lower reactor portion comprising a feed inlet and a catalyst outlet, wherein feed inlet and the catalyst outlet are positioned at or near the bottom of the lower reactor portion, and wherein the lower reaction zone is in fluid communication with and adjacent to the upper reaction zone; wherein: the catalyst comprises particulate solids and the catalyst moves in a generally downward direction through the upper reactor portion and the lower reactor portion and the hydrocarbon feed stream moves in a generally upward direction through the upper reactor portion and lower reactor portion such that the hydrocarbon feed stream and the catalyst move with a counter-current orientation; and contacting the catalyst with the hydrocarbon feed stream cracks one or more components of the hydrocarbon feed stream and forms a hydrocarbon product stream, wherein the hydrocarbon product stream comprises one or more of ethylene, propylene, or butene; and distributing the catalyst into the upper reaction zone of the counter-current reactor by passing the catalyst from a catalyst discharge zone, through the perforations of the perforated plate distributor, into the upper reaction zone, wherein the catalyst enters the perforations of the perforated plate distributor at a superficial velocity from 0.01 m/s to 10 m/s; and passing the hydrocarbon product stream out of the upper reaction zone through the hydrocarbon product outlet.

A tenth aspect of the present disclosure may include the ninth aspect, wherein a pressure difference across the perforated plate distributor is from 0.5 barg to 5 barg.

An eleventh aspect of the present disclosure may include either the ninth or tenth aspect, wherein the upper reaction zone operates with a counter-current plug flow regime.

A twelfth aspect of the present disclosure may include the eleventh aspect, wherein a catalyst to oil ratio in upper reaction zone is from 5 to 100.

A thirteenth aspect of the present disclosure may include any of the ninth through twelfth aspects, wherein the lower reaction zone operates with a dense bed fluidization regime.

A fourteenth aspect of the present disclosure may include the thirteenth aspect, wherein a weight hourly space velocity of the lower reaction zone is from 1 to 200 $hr^{-1}$.

A fifteenth aspect of the present disclosure may include any of the ninth through fourteenth aspects, wherein the method further comprises: passing the catalyst through the catalyst outlet to a catalyst regenerator, wherein the catalyst passing through the catalyst outlet is spent catalyst; regenerating at least a portion of the spent catalyst to form a regenerated catalyst; and passing the regenerated catalyst through the perforated plate distributor to the upper reaction zone.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a stream or in a reactor should be appreciated as containing, in some embodiments, a mixture of isomers of that constituent. For example, a compositional range specifying butene may include a mixture of various isomers of butene. It should be appreciated that the examples supply compositional ranges for various streams, and that the total amount of isomers of a particular chemical composition can constitute a range.

What is claimed is:

1. A method for distributing catalyst in a counter-current reactor, the method comprising:
    passing the catalyst from a catalyst hopper to a perforated plate distributor, wherein the perforated plate distributor comprises a plate extending along a substantially horizontal cross-section of the counter-current reactor, the plate comprising a plurality of perforations, and wherein the catalyst comprises particulate solids;
    distributing the catalyst into a reaction zone of the counter-current reactor by passing the catalyst from a catalyst discharge zone, through the perforations of the perforated plate distributor, into the reaction zone, wherein the catalyst enters the perforations of the perforated plate distributor at a superficial velocity from 0.01 m/s to 10 m/s, and wherein the superficial velocity is in a substantially downward direction; and
    passing a hydrocarbon feed stream into the reaction zone, wherein the catalyst moves in a substantially downward direction through the reaction zone, the hydrocarbon feed stream moves in a substantially upward direction through the reaction zone, and wherein contacting the catalyst with the hydrocarbon feed stream cracks one or more components of the hydrocarbon feed stream and forms a hydrocarbon product stream.

2. The method of claim 1, wherein a pressure difference across the perforated plate distributor is from 0.5 barg to 5 barg.

3. The method of claim 1, wherein a ratio of catalyst to hydrocarbon feed is from 5 to 100 based on the mass of the catalyst and the hydrocarbon feed.

4. The method of claim 1, wherein the plate of the perforated plate distributor comprises a first major surface and a second major surface opposite the first major surface, wherein each of the plurality of perforations is an opening extending from the first major surface to the second major surface.

5. The method of claim 1, wherein the catalyst hopper houses a catalyst bed having a dense bed fluidization regime, the catalyst overflows from the catalyst bed, and the catalyst falls through the catalyst discharge zone to the perforated plate distributor.

6. The method of claim 1, wherein passing the catalyst from a catalyst hopper to a perforated plate distributor comprises contacting at least a portion of a transported catalyst bed, comprising the catalyst and a carrying gas, with a barrier positioned within the catalyst hopper, such that the catalyst is redirected toward the perforated plate distributor through the catalyst discharge zone.

7. The method of claim 6, wherein an angle between the barrier and the perforated plate distributor is from 90° to 160°.

8. The method of claim 1, wherein a superficial velocity of the catalyst in the reaction zone is substantially opposite a superficial velocity of the hydrocarbon feed stream in the reaction zone.

9. A method for processing hydrocarbons to produce light olefins, the method comprising:
    passing a hydrocarbon feed stream into a feed inlet of a counter-current reactor, wherein the counter-current reactor comprises:
        a catalyst hopper;
        an upper reactor portion comprising an upper reaction zone, the upper reactor portion comprising a perforated plate distributor and a hydrocarbon product outlet, wherein the perforated plate distributor and the hydrocarbon product outlet are positioned at or near the top of the upper reactor portion, and wherein the perforated plate distributor comprises a plate extending along a substantially horizontal cross-section of the upper reactor portion, the plate comprising a plurality of perforations; and
        a lower reactor portion defining a lower reaction zone, the lower reactor portion comprising a feed inlet and a catalyst outlet, wherein feed inlet and the catalyst outlet are positioned at or near the bottom of the lower reactor portion, and wherein the lower reaction zone is in fluid communication with and adjacent to the upper reaction zone;
    wherein:
        the catalyst comprises particulate solids and the catalyst moves in a generally downward direction through the upper reactor portion and the lower reactor portion and the hydrocarbon feed stream moves in a generally upward direction through the upper reactor portion and lower reactor portion such that the hydrocarbon feed stream and the catalyst move with a counter-current orientation; and
    contacting the catalyst with the hydrocarbon feed stream cracks one or more components of the hydrocarbon feed stream and forms a hydrocarbon product stream, wherein the hydrocarbon product stream comprises one or more of ethylene, propylene, or butene; and
    distributing the catalyst into the upper reaction zone of the counter-current reactor by passing the catalyst from a catalyst discharge zone, through the perforations of the perforated plate distributor, into the upper reaction zone, wherein the catalyst enters the perforations of the perforated plate distributor at a superficial velocity from 0.01 m/s to 10 m/s; and
    passing the hydrocarbon product stream out of the upper reaction zone through the hydrocarbon product outlet.

10. The method of claim 9, wherein a pressure difference across the perforated plate distributor is from 0.5 barg to 5 barg.

11. The method of claim 9, wherein the upper reaction zone operates with a counter-current plug flow regime.

12. The method of claim 11, wherein a catalyst to oil ratio in upper reaction zone is from 5 to 100.

13. The method of claim 9, wherein the lower reaction zone operates with a dense bed fluidization regime.

14. The method of claim 13, wherein a weight hourly space velocity of the lower reaction zone is from 1 to 200 $hr^{-1}$.

15. The method of claim 9, further comprising:
- passing the catalyst through the catalyst outlet to a catalyst regenerator, wherein the catalyst passing through the catalyst outlet is spent catalyst;
- regenerating at least a portion of the spent catalyst to form a regenerated catalyst; and
- passing the regenerated catalyst through the perforated plate distributor to the upper reaction zone.

* * * * *